_(12)_ United States Patent
Fang

(10) Patent No.: US 9,275,030 B1
(45) Date of Patent: Mar. 1, 2016

(54) HORIZONTAL AND VERTICAL LINE DETECTION AND REMOVAL FOR DOCUMENT IMAGES

(71) Applicant: KONICA MINOLTA LABORATORY U.S.A., INC., San Mateo, CA (US)

(72) Inventor: Gang Fang, Redwood City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/502,820

(22) Filed: Sep. 30, 2014

(51) Int. Cl.
```
G06K 9/34      (2006.01)
G06F 17/24     (2006.01)
G06K 9/00      (2006.01)
G06K 9/46      (2006.01)
G06K 9/62      (2006.01)
G06T 7/00      (2006.01)
```

(52) U.S. Cl.
CPC .......... *G06F 17/245* (2013.01); *G06K 9/00449* (2013.01); *G06K 9/346* (2013.01); *G06K 9/4633* (2013.01); *G06K 9/6205* (2013.01); *G06T 7/0083* (2013.01); *G06T 7/0091* (2013.01); *G06T 7/0095* (2013.01); *G06T 2207/10008* (2013.01); *G06T 2207/20061* (2013.01); *G06T 2207/30176* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 5,898,795 A | * | 4/1999 | Bessho | G06K 9/346 382/173 |
| 6,363,162 B1 | * | 3/2002 | Moed | G06K 9/00154 382/100 |

OTHER PUBLICATIONS

K R et al., "Line Removal and Restoration of Handwritten Strokes", Conference on Computational Intelligence and Multimedia Applications, 2007, p. 208-214, (published before this application Sep. 2014).
Abd-Almageed et al., "Page Rule-Line Removal using Linear Subspaces in Monochromatic Handwritten Arabic Documents",10th International Conference on Document Analysis and Recognition, 2009, p. 768-772, (published before this application Sep. 2014).

\* cited by examiner

*Primary Examiner* — Eueng-Nan Yeh
(74) *Attorney, Agent, or Firm* — Chen Yoshimura LLP

(57) ABSTRACT

Methods for removing vertical and horizontal lines from a document image. The horizontal line removal method includes: for a column of black pixels at each horizontal position along the line, removing them if their maximum stroke width is less than the median value of maximum stroke widths in a small window centered at that horizontal position; Remove connected components remaining in the horizontal line bounding box that do not extend significantly above or below the bounding box boundaries; and Perform closing operation to join broken pieces of character strokes caused by underline removal. This method preserves character strokes while removing underlines. The vertical line removal method includes: for vertical lines that have large height to width ratio, remove parts of such lines that are not at intersection of with horizontal or near-horizontal lines; remove all remaining connected components that touch neither left nor right boundary of the bounding box.

16 Claims, 5 Drawing Sheets

"The changing international environment was an important factor that led to

Fig. 4A

"The changing international environment was an important factor that led to

Fig. 4B

"The changing international environment was an important factor that led to

Fig. 4C

"The changing international environment was an important factor that led to

Fig. 4D

HORIZONTAL AND VERTICAL LINE DETECTION AND REMOVAL FOR DOCUMENT IMAGES

BACKGROUND OF THE INVENTION

1. Field of the Invention

This invention relates to document image processing, and in particular, it relates to methods for detecting and removing horizontal and vertical lines in a document image.

2. Description of Related Art

Document images typically refer to digital images representing pages of documents which contain significant amount of text. Document images often contain lines, in particular horizontal and vertical lines, such as table lines, underline for text, etc. As characters (letters and other symbols) are typically the focus of document image analysis, such as optical character recognition (OCR), document authentication, etc., it is often desired to remove the lines. These lines are usually long in one direction and may cause errors and mistakes in the connected component analysis that followed if they are not removed clearly. Various methods for line detection and removal have been proposed, such as Hough transform, run length coding, morphology analysis, etc. However, when these methods are applied on real documents, they are often affected by the image quality and how well the image is binarized. Furthermore, in known line removal methods, removal of text underlines can often change the features of the characters that intersect with the underlines. Many known methods also suffer from incomplete line removal.

SUMMARY

The present invention is directed to a line detection and removal method and related apparatus that substantially obviates one or more of the problems due to limitations and disadvantages of the related art.

An object of the present invention is to provide a line detection and removal method that can completely remove the lines and keep the features of characters that intersect with underlines.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for removing horizontal lines from a binary document image, which includes: (a) obtaining a stroke width associated with each pixel of the binary image, wherein the stroke width associated with a given pixel is defined as a smaller one of horizontal and vertical runlengths of consecutive foreground pixels that include the pixel; (b) obtaining a bounding box representing a detected horizontal line; (c) computing a maximum stroke width at each horizontal position of the horizontal line, wherein the maximum stroke width at a given horizontal position is defined as a maximum value of the stroke widths associated with all foreground pixels belonging to the horizontal line located at that horizontal position; (d) for each column of foreground pixels located at a horizontal position along the bounding box, removing them if the maximum stroke width at that horizontal position is less than a median value of maximum stroke widths at all horizontal positions within a window of the bounding box centered at that horizontal position; (e) extracting all connected components in the bounding box that remain after step (d), and removing any connected components that extend neither above a top boundary nor below a bottom boundary of the bounding box by predetermined amounts; and (f) performing a closing operation on the binary image resulting from step (e) using a horizontal line as a structuring element.

In another aspect, the present invention provides a method for removing vertical lines from a binary document image, which includes: (a) obtaining a stroke width associated with each pixel of the binary image, wherein the stroke width associated with a given pixel is defined as a smaller one of horizontal and vertical runlengths of consecutive foreground pixels that include the pixel; (b) obtaining a bounding box representing a detected vertical line; (c) computing a maximum stroke width at each vertical position of the vertical line, wherein the maximum stroke width at a given vertical position is defined as a maximum value of the stroke widths associated with all foreground pixels belonging to the vertical line located at that vertical position; (d) computing a height to width ratio of the vertical line; (e) if the height to width ratio is greater than or equal to a threshold ratio, removing any sections of the vertical line where the maximum stroke width is smaller than a line width threshold; and (f) extracting connected component in the bounding box, and removing all connected components that touch neither a left boundary nor a right boundary of the bounding box.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 4A to 4D show examples of document image and the effect of various steps of the horizontal line removal process according to embodiments of the present invention.

DETAILED DESCRIPTION OF PREFERRED EMBODIMENTS

Embodiments of the present invention provide a vertical and horizontal line removal method for document images that are designed to remove vertical and horizontal lines as completely as possible while preserving features of the document, in particular text characters. For vertical line removal, the method is designed to preserve vertical strokes of text characters. For horizontal line removal, in particular removal of horizontal underlines for text, the method is designed to completely remove the horizontal lines while preserving text character strokes that intersect the horizontal underlines. The line removal is based on stroke width and component analysis, which attempt to maintain the character features while removing the lines.

The horizontal and vertical line detection and removal method is described with reference to FIGS. 1 to 3. The input document image is a grayscale image, where each pixel has a multi-bit pixel value, for example, from 0 to 255. If the original image (e.g. an image generated by a scanner) is a color image, it may be converted to a grayscale image first; alternatively, each color channel may be treated as a grayscale image.

Figure 1:
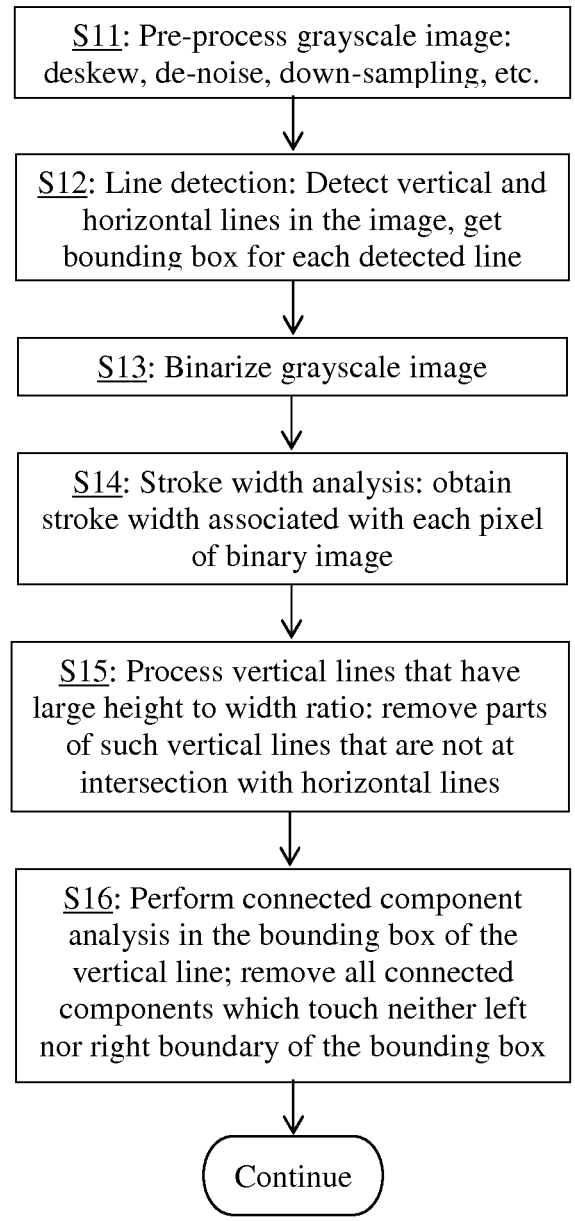
FIGS. 1 to 3 schematically illustrates a vertical and horizontal line removal method according to embodiments of the present invention.
Figure 2:
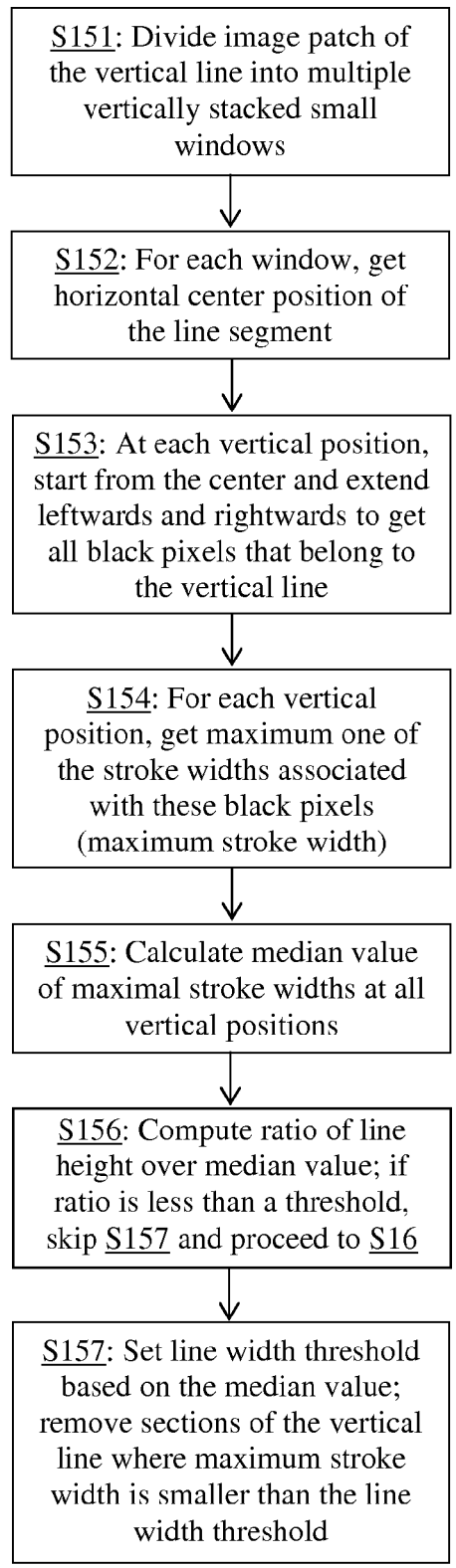

As shown in FIG. 1, first, pre-processing is optionally applied to the grayscale input image, including deskew, denoise, down-sampling, etc. (step S11). For convenience, the pre-processed grayscale image is still referred to as the input grayscale image. A vertical and horizontal line detection process is applied to the input grayscale image to detect vertical and horizontal lines in the image (step S12). The line detection process generates a set of bounding boxes each corresponding to a detected vertical or horizontal line. Any suitable method may be used for line detection. In particular, a line detection method described in commonly owned patent application entitled "Horizontal and Vertical Line Detection and Removal for Document Images" Ser. No. 14/502/796 may be used.

The input grayscale image is binarized to generate a binary image (1-bit image) (step S13). In this disclosure, the background is assumed to be white with pixel value 0 and the foreground (text, graphics, etc.) is assumed to be black with pixel value 1. Note that the definition of pixel values for black vs. white and text vs. background is a matter of choice; the implementation described here can be easily modified to adapt to different pixel value definitions.

A stroke width analysis is carried out to obtain a stroke width associated with each pixel of the binary image (step S14). Here, the stroke width associated with a given pixel is defined as the smaller one of the runlengths of consecutive black pixels in the horizontal and vertical directions that includes the given pixel. The stroke width for a white pixel (background) is zero. If a black pixel is a part of a line or character stroke, the stroke width will tend to be on the same order as a typical width of a line or character stroke in the document. If a black pixel is a part of a graphic element, its stroke width will tend to be much larger. The stroke widths will be used in various steps of the line removal process later.

Steps S15 to S18 described below pertain to vertical line removal, and steps S21 to S25 pertain to horizontal line removal.

The next set of steps (steps S151 to S157 shown in FIG. 2, collectively step S15), which are performed for each vertical line identified in step S12, processes vertical lines that have sufficiently large height to width ratios. These steps remove the parts of such vertical line that are not at the intersections with horizontal or near horizontal lines. In this disclosure, "removing" a pixel refers to setting the pixel value from a foreground value (e.g. 1) to a background value (e.g. 0).

In step S151, the patch of the binary image defined by the bounding box of the vertical line is divided into a series of smaller windows which are non-overlapping and arranged (stacked) vertically. In one particular implementation, the windows are 60 pixels in height, but other sizes may be used, such as between 30 and 200 pixels. For each window, the image is projected vertically to generate a vertical projection histogram, and the horizontal pixel position at the maximal value (peak) of the histogram is obtained as the horizontal center position of the vertical line segment in that window (step S152). At each vertical position, the black pixels that belong to the vertical line are identified by starting from the horizontal center position and extending horizontally leftwards and rightwards until the pixel becomes white or until the left or right boundaries of the window is reached (i.e., identify all consecutive black pixels connected with the one at the horizontal center position) (step S153). For all these black pixels, the stroke widths associated with them as calculated in step S14 are retrieved, and a maximum value of these stroke widths is calculated (referred to as the maximum stroke width of the vertical line at this vertical position) (step S154).

Steps S151 to S154 collectively is a step of finding the maximal stroke widths at all vertical positions for the vertical line. Alternative methods can be used to find the horizontal center position at each vertical position, and hence to identify the black pixels belonging to the line at each vertical position. For example, horizontal run length can be used to find the black pixels at each vertical position.

Note that for a pixel located within the intersection of a vertical line and a horizontal or near-horizontal line, the associated stroke width can be quite large. Thus, if a particular vertical position is located within an intersection of vertical and horizontal or near-horizontal lines, the maximum stroke width for this vertical position will be quite large.

After steps S152 to S154 are repeated for all windows, the maximum stroke width for each vertical position along the vertical line is obtained. Then, the median value of the maximal stroke widths of all vertical positions of the line is computed (step S155). A ratio of the bounding box height to the median value of all maximal stroke widths is calculated (step S156). If this ratio is greater than a predetermined threshold, the bounding box is determined to be a long vertical line and the process goes to step S157 (line removal); otherwise, step S157 is skipped and the process goes to step S16. In one example, the predetermined threshold used in step S156 is 20, but other values may be used, such as between 10 and 30. Preferably, the threshold should be sufficiently large so that vertical strokes of text characters are not deemed long vertical lines for removal.

If the line is determined to be a long vertical line in step S156, in step S157, the median value of the maximal stroke widths at all vertical positions (calculated in step S155) is multiplied by a multiplier to obtain a line width threshold value. The multiplier may be, for example, from 2 to 3, so that the line width threshold value is slightly wider than the actual line width. Then, the maximum stroke width at each vertical position of the line (calculated in step S154) is compared with the line width threshold. If the maximum stroke width is smaller than the line width threshold, the pixels at that vertical position are set to 0 (i.e. removed) (step S157). As a result of step S157, parts of the long vertical line that are not located at intersections of horizontal lines are removed.

Then, of the vertical lines that remain after step S15, which are relatively short lines, those whose connected components touch neither the left nor the right boundary of the line bounding box are removed (step S16). Specifically, for each vertical line, the connected component inside the bounding box is extracted; if the left edge of the connected component does not touch the left boundary of the bounding box and the right edge of it does not tough the right boundary of the bounding box, the vertical line is removed. Otherwise, the vertical line is kept. Because in many cases vertical strokes of text characters have other strokes intersecting them, these vertical strokes will not be removed in step S18, but vertical lines that do not intersect other lines will be removed.

Figure 3:
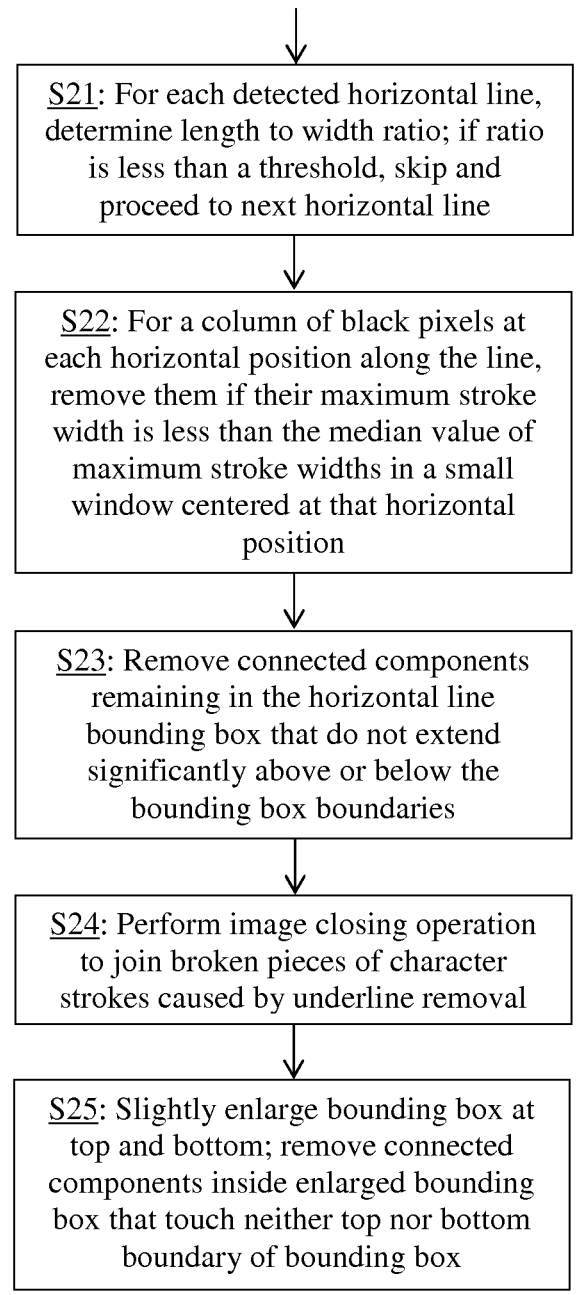

This concludes the vertical line removal, and the process continues to horizontal line removal, steps S21 to S25 (FIG. 3). Steps S21 to S25 are repeated for each horizontal line detected in step S12.

It should be noted that vertical and horizontal line removal are independent of each other and the order of the two is not important.

Because horizontal lines often appear in document images in the form of text underlines, and such underlines often intersect parts of text characters, the horizontal line removal process is designed to remove the horizontal lines without breaking up text characters.

First, for each horizontal line identified in step S12, its length to width ratio is examined, and if the ratio is less than a predetermined threshold, the line is skipped (i.e. it is not a real horizontal line and the remaining steps S22 to S25 are not performed) and the process proceeds to the next horizontal line (step S21). More specifically, the bounding box length is used as the line length, and the median value of the maximal stroke widths at all horizontal positions of the horizontal line is used as the line width. The maximum stroke width at a horizontal position of the horizontal line refers to a maximum value of the stroke widths associated with all black pixels belonging to the horizontal line located at that horizontal position. The maximal stroke width at a horizontal position and the median value of the maximal stroke widths at all horizontal positions can be computed using a set of steps similar to steps S151 to S155, with vertical and horizontal swapped and left and right changed to up and down. In one example, the predetermined threshold is 20, but other values may be used, such as between 10 and 30.

If the line is not to be skipped, then, for each horizontal position along the horizontal line, a local median value of the maximal stroke width within a small segment of the horizontal line (a small window in the bounding box) centered at that horizontal position is computed; if the maximal stroke width at that horizontal position is less than the local median value for the small window, the column of black pixels of the horizontal line at that horizontal position are removed (step S22). Step S22 utilizes the maximal stroke width at each horizontal position, which has been computed in step S21. Step S22 is repeated for all horizontal positions along the horizontal line, i.e., using a moving window. After this step, many segments of the horizontal line will be removed, although many segments will still remain.

FIG. 4A shows an example of a part of a binary document image, which is a line of text with underline. FIG. 4B shows the result of step S22; it can be seen that most parts of the horizontal underline are removed but many fragments still remain.

Then, connected components that are located at least partly within the horizontal line bounding box are extracted, and those that extend neither above the top nor below the bottom boundary of the bounding box by a predetermined amount are removed (step S23). The predetermined amount may be, for example, 10 pixels; other amounts may be used, for example, from 5 to 20 pixels. For fragments of the horizontal line not removed in step S22, and that are not at intersections with text character strokes, the connected components will not extend significantly above or below the boundaries of the bounding box and will therefore be removed in step S23. On the other hand, for fragments of the horizontal line located at intersections with character strokes, the connected component will include the character stroke, and thus will likely extend significantly above and/or below the boundaries of the bounding box; these fragments will not be removed in step S23.

For certain text characters, the above horizontal line removal steps may still result in breaking of the parts that intersect the underline. An example is shown in FIG. 4C, where the bottom part of the character "g" is broken. Thus, a closing operation is applied to the document image that results from step S23 to join together connected components that have a sufficiently small gap between them (step S24). Closing is a morphological operation that involves a dilation followed by an erosion using the same structuring element. The effect of the closing operation is to preserve regions of the background (here, white) that the structuring element can fit into, and eliminate other regions of the background (e.g. the small gaps in this example). In step S24, the structuring element is preferably a horizontal line having a length of, for example, 20 pixels; other lengths may be used, such as from 10 to 30 pixels. Other suitable shapes may be used as well. As a result of step S24, pieces of the broken character strokes are joined. This effect can be seen in FIG. 4D.

Lastly, the horizontal line bounding box is slightly enlarged at the top and bottom boundaries, for example by 5 pixels each, but other amounts may be used, such as form 2 to 15 pixels; connected components inside the bounding box that touches neither the top nor the bottom boundary of the bounding box are removed (step S25). The effect of this step is to remove fragments of the horizontal line that are not removed by the previous steps.

Figure 5:
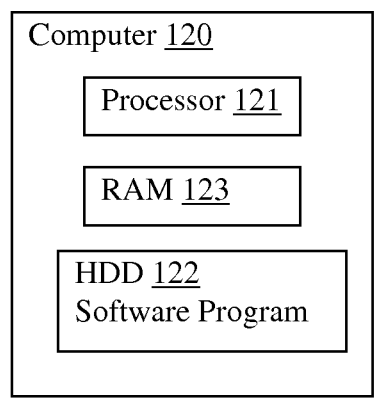
FIG. 5 schematically illustrates a data processing apparatus in which embodiments of the present invention may be implemented.

The horizontal and vertical line detection and removal method described here can be implemented in a data processing system such as a computer 120 as shown in FIG. 5. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the horizontal and vertical line detection and removal method and related apparatus of the present invention without departing from the spirit or scope of the invention. Thus, it is intended that the present invention cover modifications and variations that come within the scope of the appended claims and their equivalents.

What is claimed is:

1. A method for removing horizontal lines from a binary document image, comprising:
   (a) obtaining a stroke width associated with each pixel of the binary image, wherein the stroke width associated with a given pixel is defined as a smaller one of horizontal and vertical runlengths of consecutive foreground pixels that include the pixel;
   (b) obtaining a bounding box representing a detected horizontal line;
   (c) computing a maximum stroke width at each horizontal position of the horizontal line, wherein the maximum stroke width at a given horizontal position is defined as a maximum value of the stroke widths associated with all foreground pixels belonging to the horizontal line located at that horizontal position;
   (d) for each column of foreground pixels located at a horizontal position along the bounding box, removing them if the maximum stroke width at that horizontal position is less than a median value of maximum stroke widths at all horizontal positions within a window of the bounding box centered at that horizontal position;

(e) extracting all connected components in the bounding box that remain after step (d), and removing any connected components that extend neither above a top boundary nor below a bottom boundary of the bounding box by predetermined amounts; and (f) performing a closing operation on the binary image resulting from step (e) using a horizontal line as a structuring element.

2. The method of claim 1, wherein step (c) comprises:
dividing the bounding box into a plurality of horizontally arranged windows;
for each window:
   obtaining a vertical center position of a horizontal line segment within the window, by projecting an image patch within the window horizontally to generate a histogram and obtaining a peak position of the histogram as the vertical center position;
   at each horizontal position of the window, identifying all consecutive foreground pixels connected with the foreground pixel at the vertical center position; and
   calculating a maximum one of the stroke widths associated with all of the consecutive foreground pixels identified in the identifying step.

3. The method of claim 1, further comprising:
before step (d), determining a length to width ratio of the horizontal line in the bounding box,
wherein steps (d), (e) and (f) are performed only when the length to width ratio is greater than a predetermined threshold.

4. The method of claim 3, wherein the determining step is performed after step (c), and wherein the length to width ratio is a ratio of a length of the bounding box to a median value of the maximal stroke widths at all horizontal positions of the horizontal line.

5. The method of claim 1, further comprising, after step (e),
enlarging the bounding box at the top boundary and the bottom boundaries by second predetermined amounts; and
removing connected components in the enlarged bounding box that touch neither the top boundary nor the bottom boundary of the bounding box.

6. A method for removing vertical lines from a binary document image, comprising:
(a) obtaining a stroke width associated with each pixel of the binary image, wherein the stroke width associated with a given pixel is defined as a smaller one of horizontal and vertical runlengths of consecutive foreground pixels that include the pixel;
(b) obtaining a bounding box representing a detected vertical line;
(c) computing a maximum stroke width at each vertical position of the vertical line, wherein the maximum stroke width at a given vertical position is defined as a maximum value of the stroke widths associated with all foreground pixels belonging to the vertical line located at that vertical position;
(d) computing a height to width ratio of the vertical line;
(e) if the height to width ratio is greater than or equal to a threshold ratio, removing any sections of the vertical line where the maximum stroke width is smaller than a line width threshold; and
(f) extracting connected component in the bounding box, and removing all connected components that touch neither a left boundary nor a right boundary of the bounding box.

7. The method of claim 6, wherein step (d) comprises:
computing a median value of the maximum stroke width at all vertical positions of the vertical line; and
computing the height to width ratio of the vertical line which is defined as a ratio of a height of the bounding box to the median value of the maximum stroke width; and
wherein in step (e), the line width threshold is a multiple of the median value of the maximum stroke width.

8. The method of claim 6, wherein step (c) comprises:
dividing the bounding box into a plurality of vertically arranged windows;
for each window:
   obtaining a horizontal center position of a vertical line segment within the window, by projecting an image patch within the window vertically to generate a histogram and obtaining a peak position of the histogram as the horizontal center position;
   at each vertical position of the window, identifying all consecutive foreground pixels connected with the foreground pixel at the horizontal center position; and
   calculating a maximum one of the stroke widths associated with all of the consecutive foreground pixels identified in the identifying step.

9. A computer program product comprising a computer usable non-transitory medium having a computer readable program code embedded therein for controlling a data processing apparatus, the computer readable program code configured to cause the data processing apparatus to execute a process for removing horizontal lines from a binary document image, the process comprising:
(a) obtaining a stroke width associated with each pixel of the binary image, wherein the stroke width associated with a given pixel is defined as a smaller one of horizontal and vertical runlengths of consecutive foreground pixels that include the pixel;
(b) obtaining a bounding box representing a detected horizontal line;
(c) computing a maximum stroke width at each horizontal position of the horizontal line, wherein the maximum stroke width at a given horizontal position is defined as a maximum value of the stroke widths associated with all foreground pixels belonging to the horizontal line located at that horizontal position;
(d) for each column of foreground pixels located at a horizontal position along the bounding box, removing them if the maximum stroke width at that horizontal position is less than a median value of maximum stroke widths at all horizontal positions within a window of the bounding box centered at that horizontal position;
(e) extracting all connected components in the bounding box that remain after step (d), and removing any connected components that extend neither above a top boundary nor below a bottom boundary of the bounding box by predetermined amounts; and
(f) performing a closing operation on the binary image resulting from step (e) using a horizontal line as a structuring element.

10. The computer program product of claim 9, wherein step (c) comprises:
dividing the bounding box into a plurality of horizontally arranged windows;
for each window:
   obtaining a vertical center position of a horizontal line segment within the window, by projecting an image patch within the window horizontally to generate a histogram and obtaining a peak position of the histogram as the vertical center position;

at each horizontal position of the window, identifying all consecutive foreground pixels connected with the foreground pixel at the vertical center position; and calculating a maximum one of the stroke widths associated with all of the consecutive foreground pixels identified in the identifying step.

11. The computer program product of claim 8, wherein the process further comprises:

before step (d), determining a length to width ratio of the horizontal line in the bounding box, wherein steps (d), (e) and (f) are performed only when the length to width ratio is greater than a predetermined threshold.

12. The computer program product of claim 11, wherein the determining step is performed after step (c), and wherein the length to width ratio is a ratio of a length of the bounding box to a median value of the maximal stroke widths at all horizontal positions of the horizontal line.

13. The computer program product of claim 9, wherein the process further comprises, after step (e), enlarging the bounding box at the top boundary and the bottom boundaries by second predetermined amounts; and removing connected components in the enlarged bounding box that touch neither the top boundary nor the bottom boundary of the bounding box.

14. The computer program product of claim 9, wherein the computer readable program code is configured to cause the data processing apparatus to execute an additional process for removing vertical lines from a binary document image, the additional process comprising:

(g) obtaining a stroke width associated with each pixel of the binary image, wherein the stroke width associated with a given pixel is defined as a smaller one of horizontal and vertical runlengths of consecutive foreground pixels that include the pixel;

(h) obtaining a bounding box representing a detected vertical line;

(i) computing a maximum stroke width at each vertical position of the vertical line, wherein the maximum stroke width at a given vertical position is defined as a maximum value of the stroke widths associated with all foreground pixels belonging to the vertical line located at that vertical position;

(j) computing a height to width ratio of the vertical line;

(k) if the height to width ratio is greater than or equal to a threshold ratio, removing any sections of the vertical line where the maximum stroke width is smaller than a line width threshold; and (l) extracting connected component in the bounding box, and removing all connected components that touch neither a left boundary nor a right boundary of the bounding box.

15. The computer program product of claim 14, wherein step (j) comprises:

computing a median value of the maximum stroke width at all vertical positions of the vertical line; and computing the height to width ratio of the vertical line which is defined as a ratio of a height of the bounding box to the median value of the maximum stroke width; and wherein in step (k), the line width threshold is a multiple of the median value of the maximum stroke width.

16. The computer program product of claim 14, wherein step (i) comprises:

dividing the bounding box into a plurality of vertically arranged windows;

for each window:

obtaining a horizontal center position of a vertical line segment within the window, by projecting an image patch within the window vertically to generate a histogram and obtaining a peak position of the histogram as the horizontal center position;

at each vertical position of the window, identifying all consecutive foreground pixels connected with the foreground pixel at the horizontal center position; and calculating a maximum one of the stroke widths associated with all of the consecutive foreground pixels identified in the identifying step.

* * * * *